United States Patent
Putz

(10) Patent No.: US 12,031,598 B2
(45) Date of Patent: Jul. 9, 2024

(54) BRAKE DEVICE

(71) Applicant: GREENBRAKES GMBH, Hartberg (AT)

(72) Inventor: Michael Putz, Sebersdorf (AT)

( * ) Notice: Subject to any disclaimer, the term of this patent is extended or adjusted under 35 U.S.C. 154(b) by 0 days.

(21) Appl. No.: 17/606,311

(22) PCT Filed: Mar. 13, 2020

(86) PCT No.: PCT/EP2020/056951
§ 371 (c)(1),
(2) Date: Oct. 25, 2021

(87) PCT Pub. No.: WO2020/216526
PCT Pub. Date: Oct. 29, 2020

(65) Prior Publication Data
US 2022/0145953 A1 May 12, 2022

(30) Foreign Application Priority Data
Apr. 24, 2019 (AT) .................................. 60107/2019

(51) Int. Cl.
*F16D 65/38* (2006.01)
*F16D 55/2265* (2006.01)
(Continued)

(52) U.S. Cl.
CPC ......... *F16D 65/62* (2013.01); *F16D 55/2265* (2013.01); *F16D 65/18* (2013.01);
(Continued)

(58) Field of Classification Search
CPC ......... F16D 2055/0041; F16D 2125/64; F16D 65/54; F16D 2121/14; F16D 55/2265;
(Continued)

(56) References Cited

U.S. PATENT DOCUMENTS 3,664,469 A * 5/1972 Maurice .................. F16D 65/18
                                                        188/73.37
3,866,721 A * 2/1975 Pringle .................. F16D 65/18
                                                        188/106 F
(Continued)

FOREIGN PATENT DOCUMENTS

CN     101806328 A     8/2010
CN     102428292 A     4/2012
(Continued)

OTHER PUBLICATIONS

Office Action in Austria Application No. A 60107/2019, dated Nov. 8, 2019, 3 pages.
(Continued)

*Primary Examiner* — Nicholas J Lane
*Assistant Examiner* — Stephen M Bowes
(74) *Attorney, Agent, or Firm* — Liang & Hennessey LLP; Brian Hennessey

(57) ABSTRACT

A brake device including a guide receiving area for connecting to a bearing component, forming a brake device bearing moveable in the direction of a first straight line. The brake device has a brake caliper with a first frictional surface and a first actuation surface, a pressing part being linearly guided along the first straight line relative to the brake caliper. The pressing part has a second frictional surface and a second actuation surface, and the brake device has a spreading element which interacts with the first actuation surface and the second actuation surface. The rotation of the spreading element changes the minimum distance between the frictional surfaces. A movement damping part coupled to the spreading element is designed to damp a translational movement of the spreading element relative to the bearing component in the guide receiving area parallel to the first straight line.

17 Claims, 4 Drawing Sheets

(51) Int. Cl.
    *F16D 65/18*     (2006.01)
    *F16D 65/62*     (2006.01)
    *F16D 55/00*     (2006.01)
    *F16D 125/32*     (2012.01)
    *F16D 125/64*     (2012.01)
    *F16D 127/02*     (2012.01)

(52) U.S. Cl.
    CPC .. *F16D 2055/0029* (2013.01); *F16D 2125/32* (2013.01); *F16D 2125/645* (2013.01); *F16D 2127/02* (2013.01)

(58) Field of Classification Search
    CPC .. F16D 65/62; F16D 65/18; F16D 2055/0029; F16D 2127/02
    See application file for complete search history.

(56) References Cited

U.S. PATENT DOCUMENTS

| | | | | |
|---|---|---|---|---|
| 4,109,765 | A * | 8/1978 | Johannesen | F16D 65/18 |
| | | | | 188/72.9 |
| 4,499,977 | A * | 2/1985 | Wang | F16D 55/224 |
| | | | | 188/72.3 |
| 5,433,298 | A * | 7/1995 | Antony | F16D 65/183 |
| | | | | 188/71.9 |
| 5,927,445 | A * | 7/1999 | Bieker | F16D 65/183 |
| | | | | 188/71.1 |
| 2003/0217898 | A1* | 11/2003 | Antony | F16D 65/183 |
| | | | | 188/72.9 |
| 2004/0026184 | A1* | 2/2004 | Baumann | F16D 65/54 |
| | | | | 188/72.7 |
| 2012/0168264 | A1* | 7/2012 | Putz | F16D 65/18 |
| | | | | 188/72.1 |
| 2016/0053839 | A1* | 2/2016 | Putz | B60T 13/065 |
| | | | | 701/74 |
| 2018/0363715 | A1* | 12/2018 | Baumgartner | F16D 65/60 |
| 2022/0196094 | A1* | 6/2022 | Putz | F16D 55/226 |

FOREIGN PATENT DOCUMENTS

| | | | |
|---|---|---|---|
| DE | 3423875 | A1 | 1/1985 |
| DE | 4416175 | A1 | 11/1995 |
| DE | 19515063 | C1 | 2/1997 |
| DE | 10219148 | C1 | 9/2003 |
| DE | 112013005570 | T5 | 8/2015 |
| DE | 102015219921 | A1 | 5/2016 |
| DE | 102016103187 | A1 | 8/2017 |
| DE | 102016224534 | A1 | 11/2017 |
| EP | 0589206 | A1 | 3/1994 |
| EP | 0784162 | A2 | 7/1997 |
| EP | 1160479 | A2 | 12/2001 |
| GB | 1526884 | A * | 10/1978 ......... F16D 55/2262 |
| GB | 2373828 | A | 10/2002 |
| WO | 9634216 | A1 | 10/1996 |
| WO | 2006024512 | A1 | 3/2006 |
| WO | 2018010989 | A1 | 1/2018 |

OTHER PUBLICATIONS

International Search Report and Written Opinion in International Application No. PCT/EP2020/056951, dated Jun. 16, 2020, 17 pages.

Office Action in Chinese Application No. 202080045824.4, dated Apr. 17, 2023, 8 pages.

* cited by examiner

BRAKE DEVICE

CROSS-REFERENCE TO RELATED APPLICATIONS

The present application is a national phase application of PCT Application No. PCT/EP2020/056951, filed Mar. 13, 2020, entitled "BRAKE DEVICE", which claims the benefit of Austrian Patent Application No. A60107/2019, filed Apr. 24, 2019, each of which is incorporated by reference in its entirety.

BACKGROUND OF THE INVENTION

1. Field of the Invention

The invention relates to a brake device.

2. Description of the Related Art

Brake devices are known which have a brake caliper having a first frictional surface, a pressing part with a second friction surface being movably mounted on the brake caliper. The body to be braked, usually a brake disk, is arranged between the two frictional surfaces, wherein the two friction surfaces are pressed onto the body to be braked in order to actuate the brake device. One possibility for actuating the brake devices is hydraulic actuation, in which the contact force for actuating the brake device is provided directly via hydraulic pressure.

It is also known to apply the contact force of the frictional surfaces mechanically by means of a lever. A spreading element designed as a lever is rotated by means of a piston actuated by compressed air, wherein the rotation of the spreading element presses the pressing part of the brake caliper and thus compresses the frictional surfaces. Such a design is widespread in trucks with compressed air brake systems, since the compressed air alone usually does not apply enough pressure to adequately actuate the brake devices.

In known braking devices, the brake caliper is mounted displaceably by means of a guide receiving part on a bearing component, for example part of a wheel bearing. When the brake is actuated, the pressing part is first pressed against the brake body to be braked and then the brake caliper is also moved relative to the brake body.

The disadvantage here is that this leads to uneven wear on the frictional surfaces. Furthermore, even when the brakes are released, the frictional surface of the brake caliper continues to rub against the brake body, which increases the vehicle's energy consumption.

SUMMARY OF THE INVENTION

The object of the invention is therefore to specify a brake device of the type mentioned at the outset, with which the mentioned disadvantages can be avoided, with which a uniform wear of the friction surfaces is made possible in a simple and reliable manner, and the energy consumption is reduced.

According to the invention, this is achieved by the features of the claims.

This results in the advantage that the frictional surfaces have uniform wear and the resistance of the brake device is also reduced when the brake device is released. The position of the spreading element relative to the bearing component is kept relatively stable by the movement damping part, so that both the pressing part and the brake caliper, which are spread apart by the spreading element, move relative to the bearing component and thus also relative to the brake body. As a result, the braking force is applied by both frictional surfaces at the same time, and when the brake device is released, both frictional surfaces are released from the brake body at the same time. Since the relative movement of the spreading element in the direction of the first straight line is only damped, but is not completely prevented by forced guidance, changes in conditions over time, for example due to wear or temperature fluctuations, can be compensated for by moving the spreading element relative to the bearing component.

The dependent claims relate to further advantageous embodiments of the invention.

Express reference is hereby made to the wording of the claims, whereby the claims are inserted into the description at this point by reference and are considered to be reproduced verbatim.

BRIEF DESCRIPTION OF THE DRAWINGS

The invention is described in more detail with reference to the accompanying drawings, in which only preferred embodiments are shown by way of example. In the drawings.

DETAILED DESCRIPTION

Figure 1:
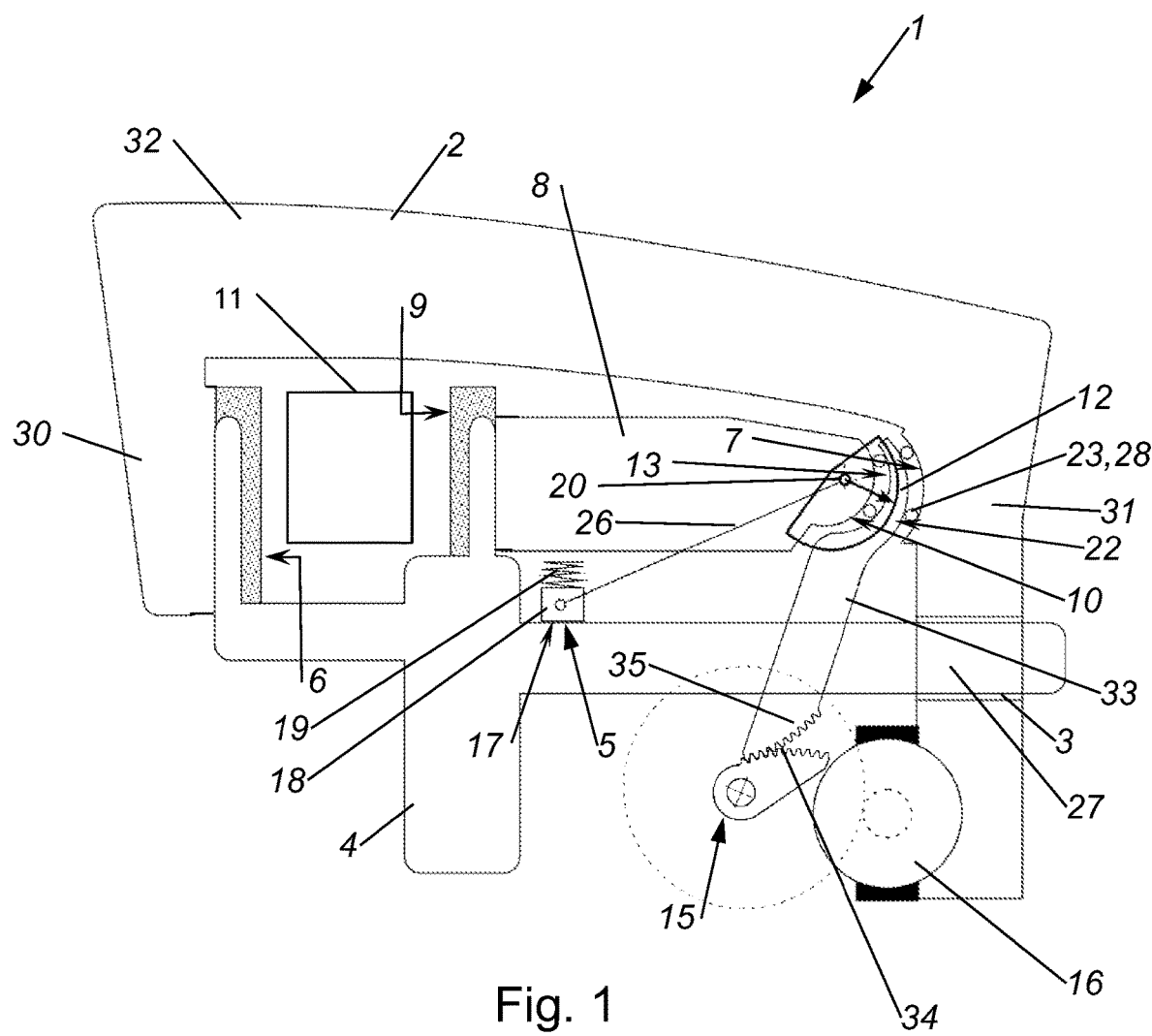
FIG. 1 shows a first preferred embodiment of the brake device in a side view as a principle illustration.

FIGS. 1 to 4 show preferred embodiments of a brake device 1 with a guide receiving part 3 for connecting to a bearing component 4 thereby forming a bearing of the brake device 1 which can be moved in the direction of a first straight line, wherein the brake device 1 has a brake caliper 2 with a first frictional surface 6 and a first actuation surface 7, wherein a pressing part 8 of the brake device 1 is guided substantially linearly along the first straight line relative to the brake caliper 2, wherein the pressing part 8 has a second frictional surface 9 facing the first frictional surface 6 and a second actuation surface 10 facing away from the second frictional surface 9, wherein a region between the first frictional surface 6 and the second frictional surface 9 is provided for the arrangement of a brake body 11, wherein the brake device 1 has a spreading element 12 which interacts with the first actuation surface 7 and the second actuation surface 10, wherein the spreading element 12 is formed in such a way that the rotation of the spreading element 12 changes a minimum distance between the frictional surfaces 6, 9, wherein a movement damping part 5 which is coupled to the spreading element 12 is designed to damp a translational movement of the spreading element 12 relative to the bearing component 4 in the guide receiving area 3 parallel to the first straight line.

This results in the advantage that the frictional surfaces 6, 9 have uniform wear and the resistance of the brake device 1 is also reduced when the brake device 1 is released. The position of the spreading element 12 relative to the bearing component 4 is kept stable by the movement damping part 5, so that both the pressing part 8 and the brake caliper 2, which are spread apart by the spreading element 12, move relative to the bearing component 4 and thus also relative to the brake body 11. As a result, the braking force is applied simultaneously by both frictional surfaces 6, 9 and when the brake device 1 is released, both frictional surfaces 6, 9 are released from the brake body 11 at the same time. Since the relative movement of the spreading element 12 in the direction of the first straight line is only damped, but not completely prevented, changes in the conditions over time, for example due to wear or temperature fluctuations, can be compensated for by shifting the spreading element 12 relative to the bearing component 4.

In particular, a method for operating the brake device 1 in question can also be provided.

The brake device 1 is designed in particular as a vehicle brake.

Furthermore, a vehicle comprising a brake device 1 can be provided. The vehicle can in particular be a car, a truck or a trailer.

A brake device 1 with a rotating brake disk can also be provided for other vehicles, for example trains and propellers.

Furthermore, the brake body 11 can also be provided for a translational movement relative to the brake device 1, in particular in the case of a brake rail for an elevator.

It is also conceivable to use the brake device 1 in a stationary machine.

The brake device 1 has the guide receiving area 3, which is provided to receive a bearing component 4 displaceably in the direction of the first straight line, so that the guide receiving part 3 together with the bearing component 4 forms a displaceable bearing of the brake device 1.

Furthermore, a brake arrangement comprising the brake device 1, the brake body 11 and the bearing component 4 can be provided, wherein the brake device 1 is mounted on the bearing component 4 such that it can be displaced in the direction of the first straight line. Here, the bearing component 4 can have a guide rod 27 running in the direction of the first straight line, wherein part of the guide rod 27 is arranged within the guide receptacle 3 so that the brake device 1 can be displaced on the guide rod 27 in the direction of the first straight line. The guide rod 27 can have a free end over which the brake device 1 can be attached. The bearing component 4 is mounted on the brake body 11 in such a way that the position of the brake body 11 relative to the bearing component 4 is constant when viewed parallel to the first straight line. The bearing component 4 can in particular be mounted so as to be rotatable relative to the brake body 11.

The brake arrangement can in particular be part of a wheel bearing.

Furthermore, a wheel bearing comprising a brake disk as a brake body 11, the bearing component 4 and a brake device 1 is provided. The axis of rotation of the brake disk runs in particular parallel to the first straight line.

A vehicle comprising at least one wheel bearing can preferably be provided.

The guide receiving area 3 can in particular be designed as an opening. This is shown by way of example in FIGS. 1 and 4.

Alternatively, the guide receiving area 3 can be designed as a blind hole. This is shown by way of example in FIGS. 2 and 3.

The brake device 1 has, in particular, a brake caliper 2 having a first leg 30, a second leg 31 and a connecting section 32 connecting the first leg 30 to the second leg 31, in particular fixedly, wherein the first frictional surface 6 is arranged on a first inner side of the first leg 30 and the first actuation surface 7 is arranged on a second inner side of the second leg 31.

The brake caliper 2 can in particular be designed in one piece. Alternatively, the brake caliper 2 can be composed of several parts.

Relative to the brake caliper 2, the pressing part 8 is at least indirectly supported in such a way that the pressing part 8 can execute a translational movement in relation to the brake caliper 2 substantially along the first straight line. Substantially guided linearly along the first straight line means that slight deflections transversely to the first straight line or superimposed tilting movements can in principle be possible. The relative mounting of the pressing part 8 to the brake caliper 2 is not explicitly shown in FIGS. 1 and 4.

The pressing part 8 and/or the brake caliper 2 can also have a wear adjuster. A wear adjuster is a component which compensates for the constant wear of the brake linings on the frictional surfaces 6, 9. Preferably, only the pressing part 8 can have the wear adjuster.

The actuation surfaces 7, 10 are arranged on the second leg 31 and on the end of the pressing part 8 facing away from the first leg 30. The actuation surfaces 7, 10 are provided for the purpose of absorbing the pressing forces which are transmitted via the brake caliper 2 and the pressing part 8 to the respective frictional surface 6, 9.

In particular, it can be provided that at least when the brake device 1 is actuated, the first actuation surface 7 is substantially fixed in relation to the first frictional surface 6, and/or that the second actuation surface 10 is substantially in a fixed position in relation to the second frictional surface 9. It can be provided here that any wear can be compensated for by the wear adjuster, but otherwise the first actuation surface 7 is fixed in relation to the first frictional surface 6 and/or the second actuation surface 10 is in a fixed position in relation to the second frictional surface 9.

A rotatable spreading element 12 is provided for actuating the brake device 1, wherein the spreading element 12 cooperates with the first actuation surface 7 and the second actuation surface 10. The spreading element 12 and the actuation surfaces 7, 10 are shaped such that when the spreading element 12 rotates in a first direction of rotation, the spreading element 12 presses the two actuation surfaces 7, 10 apart, so that the pressing part 8 presses the second frictional surface 9 in the direction of the first frictional surface 6 and the brake caliper 2 pulls the first frictional surface 6 in the direction of the second frictional surface 9. As a result, when the spreading element 12 is rotated, the minimum distance between the frictional surfaces 6, 9 is changed in a predefinable manner. The minimum distance must be measured in the direction of the first straight line. When the spreading element 12 is rotated, at least the minimum distance between the frictional surfaces 6, 9 changes, since without a return spring the frictional surfaces 6, 9 are not necessarily also returned when the spreading element 12 is returned to the starting position.

The first spreading element surface 13 is preferably fixed in relation to the remaining spreading element 12. Furthermore, it can be provided that the second spreading element surface 22 is also in a fixed position relative to the remaining spreading element 12, therefore also relative to the first spreading element surface 13.

The spreading element 12 can particularly preferably be designed in one piece.

The spreading element 12 particularly preferably has at least one predetermined point or area to which, when the spreading element 12 is rotated, both the pressing part 8 and the brake caliper perform a relative movement in the direction of the first straight line.

In particular, it can be provided that the rotation of the spreading element 12 leads to an opposite movement of the first actuation surface 7 and the second actuation surface 10 relative to the at least one predetermined point or area.

The opposite movement can in particular be substantially symmetrical. The deflection of the pressing part 8 and of the brake caliper 2 in the end position relative to the predetermined point or region of the spreading element 12 is substantially the same. This means that the two actuation surfaces 7, 10 are pressed apart to substantially the same extent. The deviation from symmetry can in particular be up to 10%.

Alternatively, it can be provided that opposite movements are asymmetrical. This asymmetry can in particular be more than 10% at the maximum deflection. Furthermore, it can be provided that the asymmetry at the maximum deflection is less than 50%.

The rotation of the spreading element 12 takes place in particular in a plane of rotation which is spanned by the first straight line and a second straight line that is orthogonal to the first straight line. This plane of rotation is therefore orthogonal to the axis of rotation 20 of the spreading element 12. This is shown by way of example in FIGS. 1, 3, and 4.

Alternatively, the axis of rotation 20 of the spreading element 12 can run substantially parallel to the first straight line. This is shown by way of example in FIG. 2.

The spreading element 12 can in particular be rotated between a starting position and an end position. The starting position corresponds to a released state of the brake device 1. The end position corresponds to a state of the brake device 1 with maximum braking force. For the actuation of the brake device 1, the spreading element 12 is rotated from the starting position in the direction of the end position.

In particular, it can be provided that the starting position corresponds to a starting angle of the spreading element 12 and the end position corresponds to an end angle of the spreading element 12, wherein the starting angle and the end angle span an operating angle range of the spreading element 12 in which operating angle range of the spreading element 12 can be rotated in the intended operation. The operating angle range can in particular have an angle of at least 15°, in particular at least 20°, particularly preferably at least 25°. This comparatively large operating angle range enables a compact design of the brake device 1. The operating angle range can preferably have an angle of at most 35°.

Furthermore, it can be provided that the spreading element 12 is operatively connected to an actuation mechanism 15, wherein the spreading element 12 is rotatable by means of the actuation mechanism 15. The actuation mechanism 15 can in particular be actuated via an actuator. The actuation mechanism 15 is designed to rotate the spreading element 12 in a predeterminable manner about the axis of rotation 20.

The brake device 1 has a movement damping part 5 which is coupled to the spreading element 12 in order to dampen a translational movement of the spreading element 12 relative to the bearing component 4 in the guide receiving area 3 parallel to the first straight line. Further movement components, for example a rotary movement of the spreading element 12 or a translational movement of the spreading element 12 with respect to the bearing component 4 transversely to the first straight line, are in particular not damped.

The effect of this movement damping part 5 is that both the brake caliper 2 and the pressing part 8 move relative to the bearing component 4, and thus also to the brake body 11, when the brake device 1 is actuated, even if neither of the two frictional surfaces 6, 9 is in contact with the brake body 11. This takes place in that the translational movement of the spreading element 12 relative to the bearing component 4, that is to say that component of the movement of the at least one predeterminable area or predeterminable point of the spreading element 12, which takes place parallel to the first straight line, is damped in a predeterminable manner, i.e. is provided with resistance shifting. As soon as one of the two frictional surfaces 6, 9 is in contact with the brake body 11, the pressing force is higher than the resistance force of the movement damping part 5, as a result of which the spreading element 12 can re-center itself with respect to the brake body 11 with each braking process.

The movement damping part 5 therefore has the effect of damping a relative movement of the spreading element 12 with respect to the bearing component 4 to a greater extent than the relative movements of the brake caliper 2 and the pressing part 8 relative to the bearing component 4. Since the brake caliper 2 and the pressing part 8 move relative to the spreading element 12, the spreading element 12 forms a common center of movement of the brake caliper 2 and the pressing part 8 relative to the bearing component 4, which remains substantially in a stable position relative to the brake body 11. As a result, when the brake device 1 is actuated, both frictional surfaces 6, 9 are fed to the braking body 11 on both sides and are lifted off the braking body 11 again after the brake device 1 is released.

In particular, it can be provided that the movement damping part 5 has a contact surface 17 for contacting the bearing component 4, and that the damping of a translational movement between the movement damping part 5 and the bearing component 4 occurs through friction between the contact surface 17 and the bearing component 4. The damping can therefore take place through friction between this contact surface 17 and the movement damping part 5. This means that the damping can be carried out in a particularly simple manner.

Alternatively, the damping can also take place magnetically or fluid-dynamically.

Figure 4:
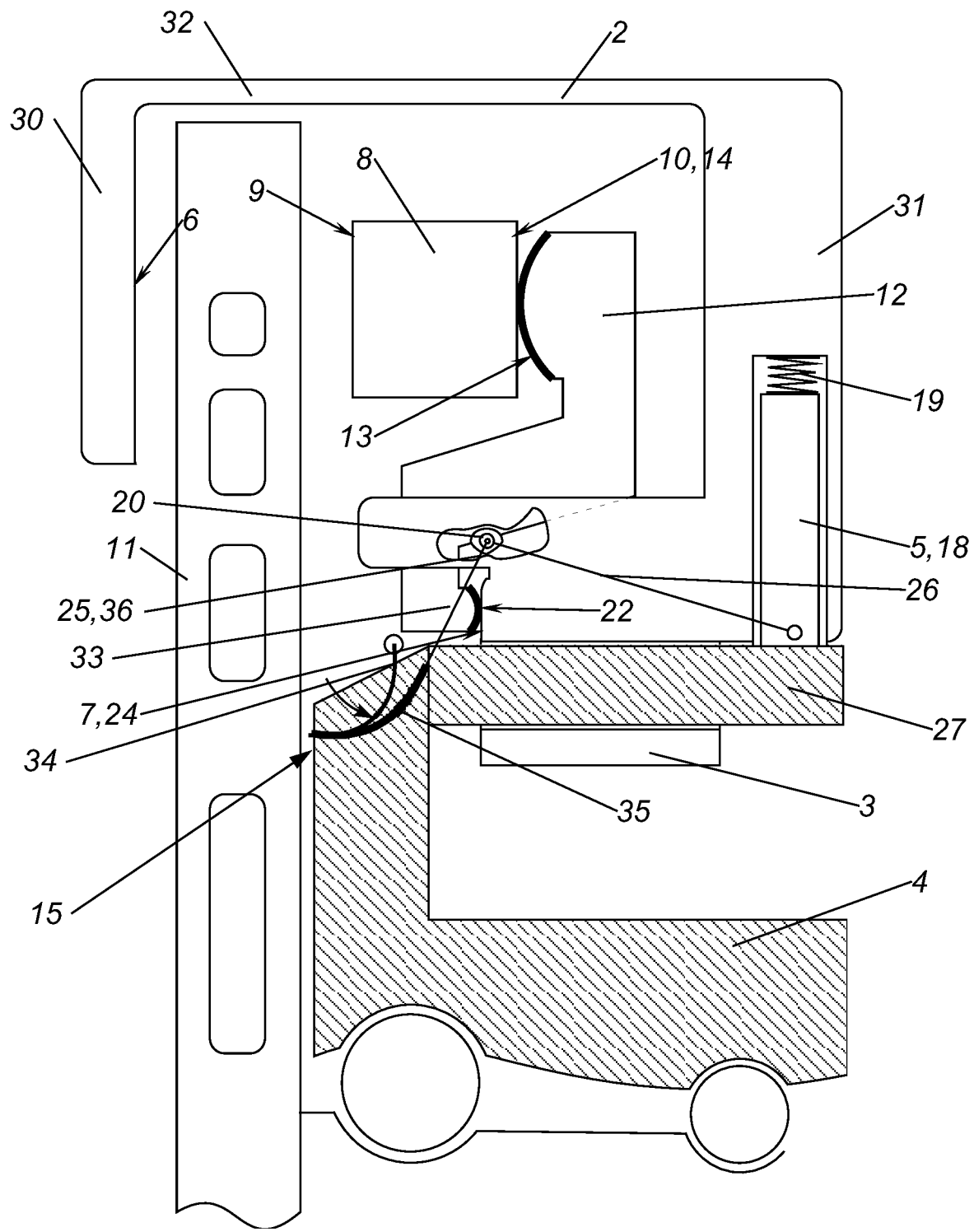
FIG. 4 shows a fourth preferred embodiment of the brake device in a side view as a principle illustration.

The coupling of the movement damping part 5 to the spreading element 12 can be designed in many ways. In FIGS. 1 and 4, the coupling of the spreading element 12 to the movement damping part 5 is only indicated by a connecting line 26.

In particular, a predetermined point or region of the spreading element 12, at which—viewed in the direction of the first straight line—both the brake caliper 2 and the pressing part 8 are held in a fixed position when the spreading element 12 is rotated, at least in the direction of the first line. At least in the direction of the first line means in this context that this point or region of the spreading element 12 can move normally to the first straight line or a rotational movement of the spreading element 12 around this point or region is possible.

It can particularly preferably be provided that the axis of rotation 20 of the spreading element 12 is held substantially in a fixed position relative to the movement damping part 5, at least in the direction of the first straight line. In particular, the axis of rotation 20 of the spreading element 12 can be mounted on the movement damping part 5. The movement damping part 5 can therefore be coupled to the axis of rotation 20 of the spreading element 12 in such a way that the axis of rotation 20 of the spreading element 12 cannot move in the direction of the first straight line relative to the movement damping part 5. In this case, the predetermined point of the spreading element 12 is the defined axis of rotation 20. A coupling of the movement damping part 5 to the spreading element 12 can thereby be achieved in a simple manner.

A movement normal to the first straight line can, however, still be possible, for example if the pivot bearing 39 of the axis of rotation 20 on the movement damping part 5 is an elongated hole running normal to the first straight line.

Furthermore, it can be provided that the movement damping part 5 is coupled to the spreading element 12 via the actuation mechanism 15. As a result, an additional mounting of the axis of rotation 20 on the movement damping part 5 is not required.

Particularly preferably, it can be provided that the brake device 1 has at least one return spring that counteracts a spreading effect of the spreading body 12. It can be provided that the spring force of the return spring causes the two frictional surfaces 6, 9 to move apart. This means that when the spreading element 12 is returned to the initial position after a brake actuation, the return spring also returns the pressing part 8 relative to the brake caliper 2 into a starting position. As a result, grinding of the frictional surfaces 6, 9 on the brake body 11 when the brake device 1 is released can be avoided. The two frictional surfaces 6, 9 are also lifted from the brake body 11 at the same time by the movement damping part 5. Furthermore, the two air gaps between the brake body 11 and the respective frictional surfaces 6, 9 can be ensured by the spreading element 12 and its coupling to the movement damping part 5.

It can preferably be provided that, in order to rotate the spreading element 12, the spreading element 12 is operatively connected to an electric motor 16 via the actuation mechanism 15. Here, the electric motor 16 forms the actuator for the actuation mechanism 15. The actuation mechanism 15 translates a rotational movement of the electric motor 16 into a rotational movement of the spreading element 12. The electric motor 16 can in particular be a servo motor. The electric motor 16 can in particular be attached to the brake caliper 2. In terms of effect, actuation by means of an electric motor 16 differs from actuation by means of hydraulics or pneumatics in that a position of the spreading element 12 can be specified by means of the electric motor 16, while with hydraulics or pneumatics only a torque of the spreading element 12 can be specified. As a result, the requirements of an electric motor 16 in terms of the precision of the movement sequences of the actuation mechanism 15 and of the spreading element 12 are significantly higher, since incorrect positions cannot simply be automatically compensated for. Although an electric motor 16 otherwise has many advantages over hydraulics or pneumatics, electromechanical brakes are often very complex. The brake device 1 in question with an electric motor 16, on the other hand, allows precise specification of the movement sequences with a comparatively simple structure.

It is also particularly preferably provided that the electric motor 16 is designed as a brushless direct current motor. Such an electric motor 16 is also referred to in English as a BLDC motor, BLDC—in a manner known per se—standing for Brushless Direct Current.

In particular, a brake system comprising at least one brake device 1 can be provided, wherein the brake system in particular has at least one control and monitoring unit and at least one regulator in order to control the electric motor 16 or to enable a corresponding regulation of the electric motor 16. The controller is electrically connected to the electric motor 16, and is designed, for example, to include an inverter circuit or a bridge circuit. The controller can be designed as any desired controller and as a result of any desired method, provided that the controller is designed or able to control, in particular a position and/or a torque. The controller must of course be technically capable of regulating the respectively selected electric motor 16.

In the presently preferred embodiment of the electric motor 16 as a BLDC motor, it is preferably provided that the controller is designed as a controller specially designed or provided for BLDC motors. Such controllers, which include position, torque and speed control, are known in the relevant technical field of controlling BLDC motors. In particular, it is provided that such a controller transfers position, torque limitation, and speed limitation to a control and monitoring unit at the same time.

In particular, it can be provided that the control and monitoring unit is designed to receive a braking action request on the input side, and to generate a braking control signal based on the braking action request and output it to the controller 10 of the electric motor 16.

The regulation of the electric motor can in particular take place without force sensors, that is to say without the aid of additional force sensors.

The regulation of the electric motor can particularly preferably take place substantially on the basis of a current consumption of the electric motor 16. In this case, substantially on the basis of a current consumption means that the regulation takes place predominantly on the basis of the current consumption of the electric motor 16, while any other measured values are only used for a correction function. The power consumption of the electric motor 16 allows conclusions to be drawn about the contact pressure of the spreading element 12 and thus the braking force of the brake device 1. A regulation of this type has the advantage that it is particularly simple and does not depend much on additional sensors, since the current consumption of the electric motor 16 is easy to measure. A disadvantage of such a control is often that variable internal resistances of the brake device 1 change the power consumption of the electric motor 16 in order to reach a certain position, which would require complex corrections. Due to the structure with the rolling spreading element, however, the variable internal resistances can be kept low, whereby such a regulation is particularly advantageous.

Here, the control and monitoring unit can also be formed from at least one first value of at least one first operating parameter of at least one part of the brake device, determined during a first movement of the spreading element 12 by means of the electric motor 16, as well from at least one second value of the first operating parameter of the part of the brake device 1, determined during a second movement of the spreading element 12 counter to the first movement by means of the electric motor 16, at least one operating behavior value, in particular an operating behavior value, preferably an operating behavior function, for a real operating behavior of the brake device 1 in question.

Furthermore, by comparing the at least one real operating behavior value with at least one stored operating behavior expectation, the control and monitoring unit can determine at least one correction factor, in particular at least one correction factor set, preferably at least one correction curve, and furthermore the brake control signal in order to correct the at least one correction factor, in particular the correction factor set, preferably the correction curve, and to control the controller with the corrected brake control signal.

The first operating parameter can preferably be a power consumption of the electric motor 16, wherein the first value is a first current consumption of the electric motor 16, and the second value is a second current consumption of the electric motor 16.

In particular, the control and monitoring unit can furthermore be designed to control the electric motor 16 in at least one period of time that is free of braking action requirements in such a way that the first movement and the second movement of the friction surface 6 only take place within a gap between the frictional surface 6 and the brake body 11, i.e. the frictional surface 6 does not contact the brake body 11. As a result of the two movements, the expected operating behavior can therefore be continuously determined during operation without the function of the brake device being impaired.

Furthermore, it can be provided that the brake system furthermore has at least one brake temperature sensor which is connected to the control and monitoring unit and which is preferably arranged in the region of the at least one frictional surface 6, 9.

It can preferably be provided that the actuator, in particular the electric motor 16, is designed to move the spreading element 12 from the starting position into the end position. If the actuator fails, the brake device 1 remains in an unbraked state.

Alternatively, it can be provided that the spreading element 12 can be actuated by hydraulics or pneumatics.

Alternatively, it can be provided that an actuation spring exerts a force on the actuation mechanism 15, which acts in the direction of the end position, and that the actuator, in particular the electric motor 16, counteracts the actuation spring. In this case, the brake device 1 brakes automatically if the actuator fails.

Furthermore, it can be provided that a second actuator is operatively connected to the actuation mechanism 15. This second actuator can in particular be a parking brake activation unit. As a result, the same brake device 1 can be used both for braking a vehicle during operation and for parking.

The actuation mechanism 15 can be operatively connected to the two actuators in such a way that the first actuator is disengaged when the second actuator is actuated. The second actuator can, however, also be used to still actuate the brake device 1 safely in the event of a failure of the electric motor 16.

The second actuator can in particular be a cable pull. A parking brake can easily be operated with a cable.

The second actuator can alternatively be a second electric motor. The second electric motor can in particular have a lower power than the electric motor 16.

It can preferably be provided that the shape of the spreading element 12 and the actuation surfaces 7, 10 causes a non-linear translation between the rotation of the spreading element 12 and the deflection of the two actuation surfaces 7, 10 to the point of the spreading element 12 coupled to the movement damping part 5. As a result, a non-linear translation formed in both directions can already be provided through the interaction of the spreading element 12 with the actuation surfaces 7, 10.

It can particularly preferably be provided that the actuation mechanism 15 has a non-linear translation between a rotation of the electric motor 16 and a rotation of the spreading element 12. This non-linearity is a transmission ratio that changes over the actuation movement. Due to the non-linear translation of the actuation mechanism 15, the varying torque for rotating the spreading element 12 can be compensated for in the operating angle range. This varying torque is caused by the fact that in an initial range of the operating angle range the spreading element 12 only has to apply the force to overcome the air gap, while when the frictional surfaces 6, 9 come into contact with the brake body 11, the force required for further rotation increases considerably due to the contact pressure. Another advantage of the non-linear translation of the actuation mechanism 15 is that when designing the spreading element 12, less attention has to be paid to the non-linearity of the translation of the spreading element 12, whereby the spreading element 12 can be optimized with regard to other features, for example a particularly small deflection during actuation across the first straight line.

The actuation mechanism 15 can in particular have a non-linear translation between an actuation of the second actuator and/or the actuation spring and a rotation of the spreading element 12.

The actuation mechanism 15 can in particular be designed in such a way that a motor torque of the electric motor 16 required to actuate the brake device 1 is substantially constant in a large part of the operating angle range.

The non-linear translation of the actuation mechanism 15 is preferably designed in such a way that the first frictional surface 6 is moved to bridge an air gap up to the brake body 11 at a higher speed than when the first frictional surface 6 is already in contact with the brake body 11 during a braking process.

A translation of the actuation mechanism 15 can vary within the operating angle range by a factor of up to 1:15, preferably up to 1:8.

The non-linear translation can take place by rolling on curves with non-constant curvatures, and/or via non-circular gear segments and/or gears, and/or by means of other variable normal distances such as levers and rods.

It can particularly preferably be provided that the spreading element 12 is connected to a lever 33, in particular is fixedly connected, with pivoting of the lever 33 rotating the spreading element 12.

It can preferably be provided that the electric motor 16 rotates a first control curve 34, which first control curve 34 rolls with a second control curve 35 on the lever 33 of the spreading element 12 in the operating angle range substantially without slipping. This is shown by way of example in FIGS. 1, 3, and 4. The slip-free rolling of the two control curves 34, 35 can take place by frictional engagement or by means of a toothing.

Alternatively, it can be provided that the actuation mechanism 15 has a wheel 37 driven by the electric motor 16 with a control cam 38, and that the control cam 38 interacts with a lever 33 of the spreading element 12. Due to the arrangement of the wheel 37 and the shape of the lever 33, the non-linear translation can be easily implemented. Such a configuration of the actuation mechanism 15 is shown in addition to the control curves 34, 35 by way of example in FIG. 3.

Furthermore, it can be provided that the lever 33 is actuated by means of a control cam.

Figure 2:
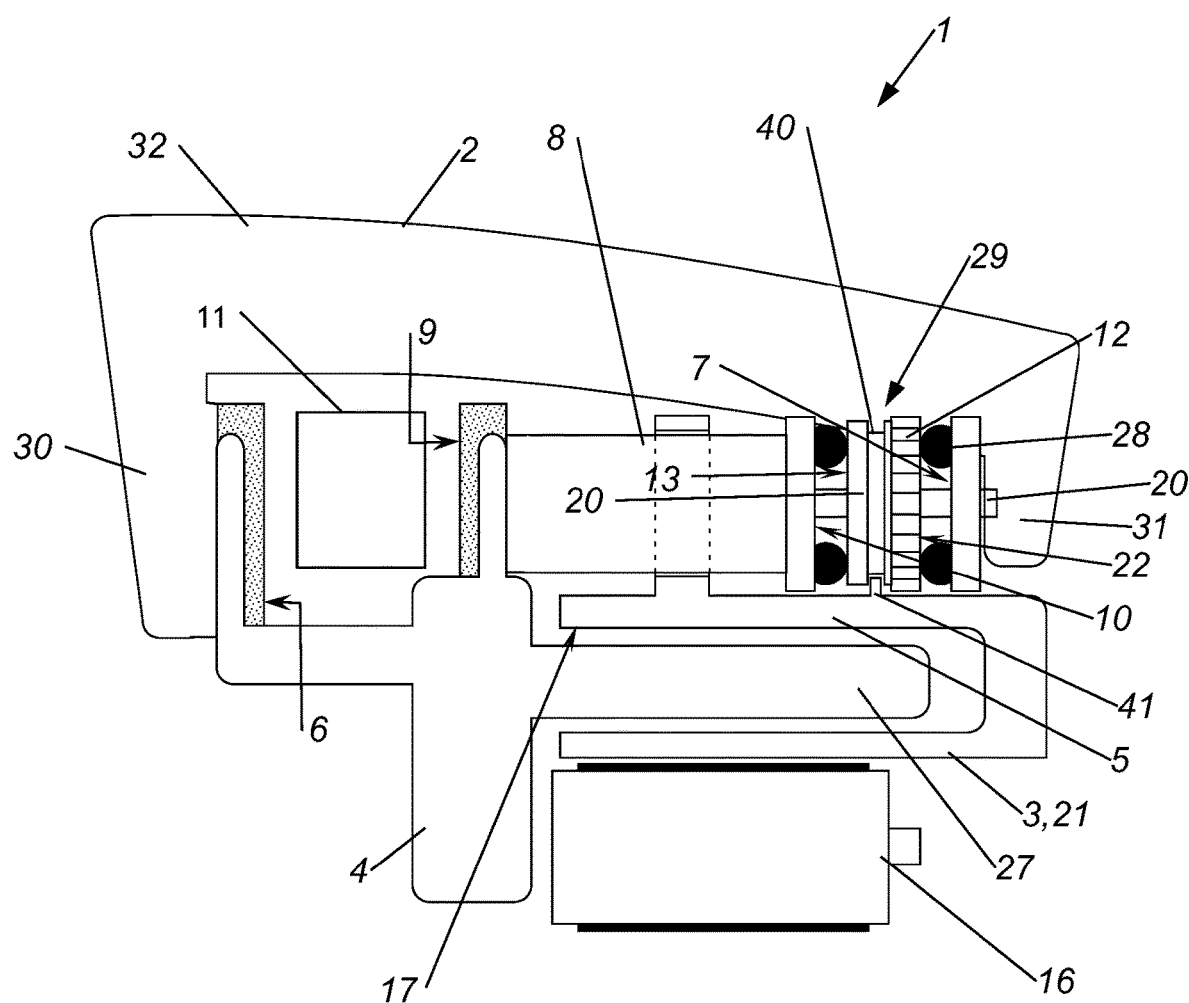
FIG. 2 shows a second preferred embodiment of the brake device in a side view as a principle illustration.

The actuation mechanism 15 is not shown in FIG. 2.

Alternatively, an actuation mechanism 15 with a linear translation could also be provided.

It can preferably be provided that the movement damping part 5 has a fastening component 21, that the guide receptacle 3 is part of the fastening component 21, and that the brake caliper 2 and the pressing part 8 are guided linearly on the fastening component 21 essentially along the first straight line. The movement damping part 5 therefore forms a third component of the brake device 1, via which the brake device 1 is mounted on the bearing component 4 and on which the brake caliper 2 and the pressing part 8 are mounted. As a result, the movement of the brake caliper 2 and the pressing part 8 is decoupled from the bearing component 4 in a simple manner, since the brake caliper 2 and the pressing part 8 are mounted on the movement damping part 5. Here, the guide receptacle 3 itself provides the contact surface 17. Such a design is shown by way of example in FIGS. 2 and 3. Here, the mounting of the pressing part 8 on the fastening component 21 is only shown in FIG. 2, while further mountings of the pressing part 8 or the brake caliper 2 on the fastening component 21 are not shown.

Figure 3:
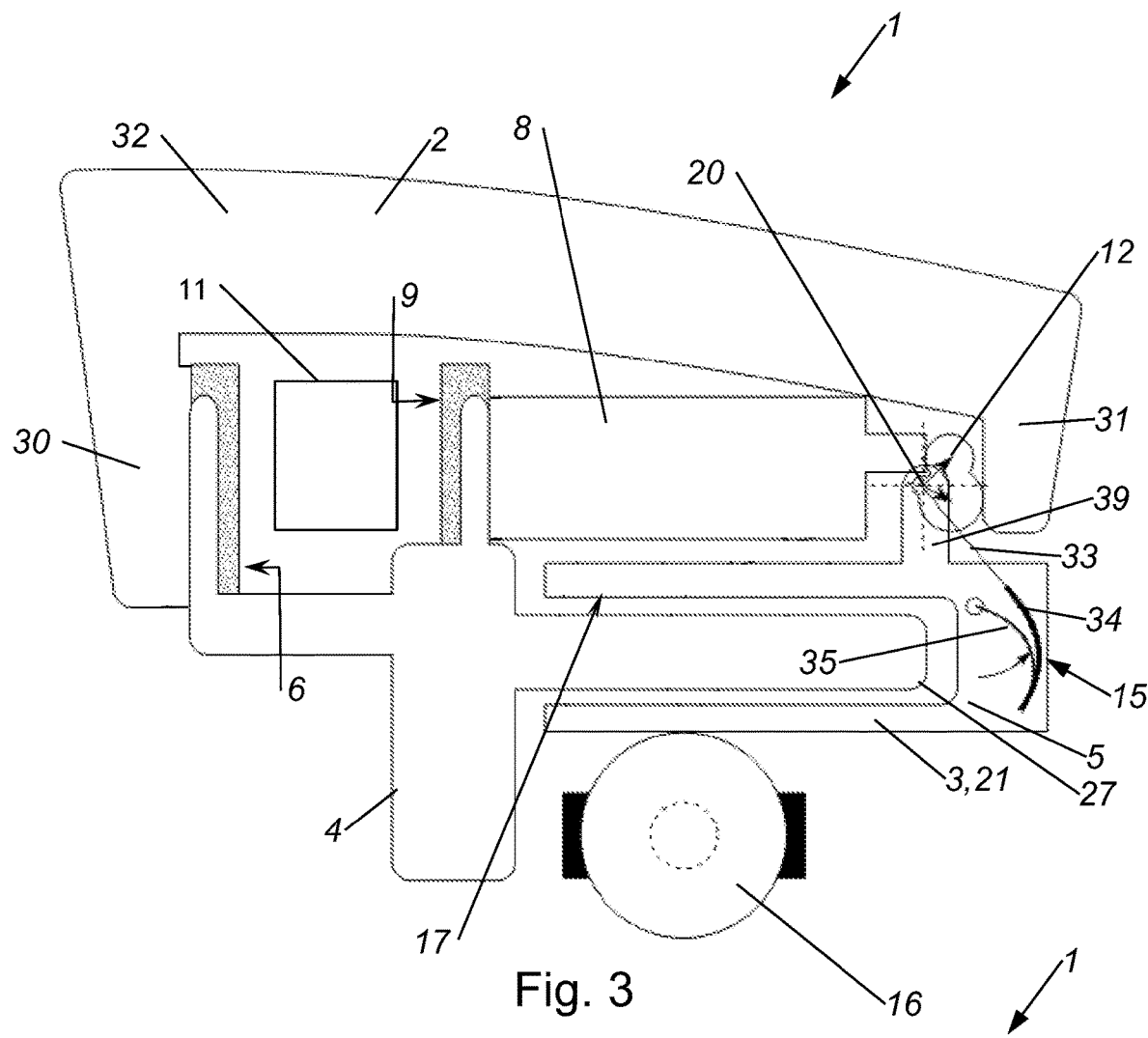
FIG. 3 shows a third preferred embodiment of the brake device in a side view as a principle illustration.

As can be seen in FIG. 3, a pivot bearing 39 for the axis of rotation 20 of the spreading element can be attached to the fastening component 21, whereby the movement of the spreading element 12 to the bearing component 4 is automatically damped via the friction between the guide receiving area 3 and the bearing component 4.

It can particularly preferably be provided that the actuation mechanism 15 and the electric motor 16 are arranged on the fastening component 21. If the axis of rotation 20 of the spreading element 12 is also mounted on the fastening component 21, a very precise actuation mechanism 15 can be provided, which is essentially independent of the movements of the spreading element 12 relative to the brake caliper 2 or pressing part 8.

Furthermore, it can be provided that the electric motor 16 is arranged on the fastening component 21 on a side of the guide receiving area 3 facing away from the spreading element 12. It has been shown here that on a side of the guide receiving area 3 facing away from the guide receiving area 3, the temperature fluctuations caused by the operation of the brake device 1 are small. By arranging the electric motor 16 at this point, the service life of the electric motor 16 can be extended.

Alternatively, it can be provided that the guide receiving area 3 is part of the brake caliper 2, wherein the movement damping part 5 is movably connected to the guide receiving area 3 in the direction of the first straight line. Such a design is shown by way of example in FIGS. 1 and 4. Here, the brake device 1 is mounted on the bearing component 4 via the brake caliper 2, wherein the movement damping part 5 is designed as an additional part, which damps the movement relative to the bearing component 4 when the bearing component 4 is displaced with respect to the guide receiving area 3. This eliminates the need for a separate fastening part 21 and an additional mounting of the brake caliper 2 on the latter.

It can preferably be provided that the movement damping part 5 has a pin 18 movably mounted in the guide receiving area 3 in the direction of the first straight line, wherein the pin 18 is operatively connected to a spring 19 for exerting a spring force on the bearing component 4. Here, the contact surface 17 is the end of the pin facing the interior of the guide receiving area 3. The pin 18 is mechanically coupled in the direction of the first straight line to the position of the axis of rotation 20 of the spreading element 12, so that the position of the axis of rotation 20 of the spreading element 12 follows the pin 18. This coupling between the axis of rotation 20 of the spreading element 12 and the pin 18 is indicated in FIGS. 1 and 4 by means of a connecting line 26. In the event of an actuation of the brake device 1, the pin 18 remains substantially fixed in relation to the bearing component 4, while the brake caliper 2 and the pressing part 8 move relative to the pin 18. For this purpose, the friction between the pin 18, the guide receiving area 3 and the bearing component 4 as well as the spring force of the spring 19 can be adjusted in such a way that the guide receiving area 3 first slides on the bearing component 4 before the pin 18 begins to slide relative to the bearing component 4.

Provision can preferably be made for at least one rolling body 28, in particular a plurality of rolling bodies 28, to be arranged between the spreading element 12 and the first actuation surface 7 and/or the second actuation surface 10.

It can be provided here that the spreading element 12 is mounted on the first actuation surface 7 and/or the second actuation surface 10 in a roller bearing 23, in particular designed as a needle bearing. With the roller bearing 23, relative movements between the actuation surfaces 7, 10 and the spreading element surfaces 13, 22 can be compensated for in a relatively simple manner.

Furthermore, it can preferably be provided that the roller bearing 23 is at least partially in the shape of a cylinder jacket. This means that the roller bearing 23 is designed at least as a circular arc-shaped bearing shell but can also be designed as a completely encompassing circle. The center of the circle of the circular arc-shaped bearing shell is at a distance from the axis of rotation 20, as a result of which the position of the roller bearing 23 relative to the axis of rotation 20 changes when the spreading element 12 is rotated.

It can preferably be provided that a rotation of the spreading element 12, in addition to a deflection of the two actuation surfaces 7, 10 in the direction of the first straight line, also causes a deflection of the two actuation surfaces 7, 10 normal to the first straight line. As a result, in addition to a translational movement of the pressing part 8 with respect to the brake caliper 2, there is also a tilting movement of the pressing part 8 with respect to the brake caliper 2. This tilting movement can be used to counteract a slight bending of the brake caliper 2 caused by the forces of the frictional surface 6, 9 on the brake body 11.

Alternatively, it can preferably be provided that the pressing part 8 is guided linearly relative to the brake caliper 2 along the first straight line. There is essentially no deflection of the two actuation surfaces 7, 10 normal to the first straight line. This has the advantage that the mounting of the pressing part 8 in relation to the brake caliper 2 requires significantly less play.

In FIG. 1, a preferred embodiment is shown in which the spreading element 12 is mounted on both actuation surfaces 7, 10 by means of roller bearings 23. Here, both roller bearings 23 each have circle centers which are spaced apart from the axis of rotation 20 of the spreading element 12. By rotating the spreading element 12, the position of the two circle centers of the two roller bearings 23 also changes, as a result of which the two actuation surfaces 7, 10 are spread apart. The two circle centers can in particular be substantially the same distance from the axis of rotation. This is illustrated in FIG. 1 by the segment of a circle, which illustrates a circle running between the two spreading element surfaces 13, 22 and starting from the axis of rotation 20. This arrangement results in a tilting movement between the pressing part 8 and the brake caliper 2.

Furthermore, it can be provided that when the spreading element 12 is rotated to actuate the brake device 1, a first spreading element surface 13 is in direct contact with a first rolling surface 14 and substantially rolls on the first rolling surface 14, and that the first rolling surface 14 corresponds to the first actuation surface 7 or the second actuation surface 10. The first rolling surface 14 can correspond to either the first actuation surface 7 or the second actuation surface 10. The fact that the first spreading element surface 13 is in direct contact with the first rolling surface 14 means that no additional rolling bodies are arranged between the first spreading element surface 13 and the first rolling surface 14. Substantially rolling means that a slight slippage is possible between the first spreading element surface 13 and the first rolling surface 14 when rolling. As a result, the internal resistance of the brake device can be reduced, since no additional rolling elements are required. The spreading element 12 has a second spreading element surface 22 which interacts with that actuation surface 7, 10 which is not the first rolling surface 14. In particular, it can be provided that the second spreading element surface 22 interacts with the first actuation surface 7.

The first rolling surface 14 is preferably essentially orthogonal to the first straight line. As a result, a contact pressure of the first spreading element surface 13 parallel to the first straight line does not result in any substantial force component normal to the first straight line. A slight deviation of the first rolling surface 14 from this alignment is possible, however, provided the static friction between the first rolling surface 14 and the first spreading element surface 13 is sufficient to prevent sliding. The first rolling surface 14 can in particular have flat areas and/or curved areas.

Furthermore, it can be provided that when the spreading element 12 rotates to actuate the brake device 1, a second spreading element surface 22 is in direct contact with a second rolling surface 24 and substantially rolls on the second rolling surface 24, and that the second rolling surface 24 corresponds to the actuation surface 7, 10 which is not the first rolling surface 14. This means that both spreading element surfaces 13, 22 essentially roll on one of the two actuation surfaces 7, 10. The rotation of the two spreading element surfaces 13, 22 takes place with respect to a common axis of rotation 20.

In FIGS. 3 and 4 preferred embodiments are shown in which both spreading element surfaces 13, 22 roll on the actuation surfaces 7, 10. However, it is also possible to roll the spreading element on one actuation surface 7, 10 and to form a roller bearing 23 on the other actuation surface 7, 10.

In the arrangement shown in FIG. 3, in addition to a translational movement of the pressing part 8 relative to the brake caliper 2, there is also a tilting movement.

However, it has also been shown that it is possible to guide the pressing part 8 linearly along the first straight line on the brake caliper 2, wherein the first spreading element surface 13 is in direct contact with one of the two actuation surfaces 7, 10 during actuation and rolls thereon, wherein the relative movements of the pressing part 8 to the brake caliper 3 normal to the first straight line can be kept negligibly small. When the spreading element is rotated from a starting position 18, a relative change in distance caused by the rotation transversely to the first straight line between the two spreading element surfaces 13, 22 is balanced at least in part by the rolling movement of at least one of the spreading element surfaces 13, 22 on at least one of the actuation surfaces 7, 10, whereby the relative movement between the brake caliper 2 and the pressing part 8 normal to the first straight line can be kept low. As a result of the direct rolling of the spreading element 12 on at least one of the two actuation surfaces 7, 10, the brake device 1 manages without an additional roller bearing at this critical point. This results in the advantage that the brake device 1 functions reliably and with low actuation resistances with little wear, but can nevertheless be designed in a simple and compact manner Such a preferred embodiment is shown by way of example in FIG. 4.

The first spreading element surface 13 is preferably arranged opposite the axis of rotation 20 and/or the second spreading element surface 22 in such a way that when rotating from the starting position in the direction of the end position, a distance between the first spreading element surface 13 and the rotation axis 20 and/or the second spreading element surface 22 steadily increases. However, due to the simultaneous rolling of the first spreading element surface 13 on the rolling surface 14, i.e. the actuation surface 7, 10 in contact with the first spreading element surface 13, this relative change in the distance between the first spreading element surface 13 and the axis of rotation 20 and/or the second spreading element surface 22 parallel to the second straight line with respect to the rolling surface 14 is again at least partially balanced.

The profile of the spreading element 12 can, viewed in the plane of rotation of the spreading element 12, be formed in particular substantially Z-shaped, wherein the first spreading element surface 13 and the second spreading element surface 22 are arranged at the opposite ends of the Z-shape and point in an opposite direction.

It can preferably be provided that the spreading element 12 has a guide 25 at its axis of rotation 20, and that the guide 25 supports the axis of rotation 20 of the spreading element 12 against forces transverse to the first straight line, at least in an initial range of the rotation of the spreading element 12 against the brake caliper 2 for actuating the brake device 1. The guide 25 can in particular be arranged in an elongated hole 36 in the brake caliper 2 that runs substantially parallel to the first straight line. The guide 25 has the task of preventing uncontrolled movement of the spreading element 12, especially in the initial area.

In particular, it can be provided that the guide 25, in particular in the elongated hole 36, also makes a substantially rolling movement. For this purpose, the guide 25 and/or the elongated hole 36 can be shaped according to suitable rolling curves.

In particular, the guide 25 can be designed in such a way that the guide provides support only in the initial range of the operating angle range. The initial range can in particular cover a maximum of the first 25% of the operating angle range starting from the initial position 18. Outside the starting area, the position of the spreading element 12 is already sufficiently defined by the static friction between the at least one spreading element surface 13, 22 and the at least one rolling surface 14, 24, which would result in a kinematic over-definition by the guide 25. In terms of construction, this can be achieved by widening the elongated hole 36 or by designing the guide 25 as an open groove.

Alternatively, it can be provided that the support by the guide 25 takes place essentially in the entire operating angle range.

It can in particular be provided that the second spreading element surface 22 is arranged closer to the axis of rotation 20 than the first spreading element surface 13. As a result, an error of the axis of rotation 20 to the brake caliper 2 to be compensated by the guide 25 turns out to be less.

When the spreading element 12 is rotated over the entire operating angle range, an error orthogonal to the first straight line, i.e. parallel to the second straight line, is less than 15%, preferably less than 10%, particularly preferably less than 7%, than the deflection of the two actuation surfaces 7, 10, parallel to the first straight line. The error here denotes the deflection of the two actuation surfaces 7, 10 parallel to the second straight line in the case of an ideal rolling movement of the at least one spreading element surface 13, 22 on the at least one rolling surface 14, 24. Even with a precise design of the brake device 1, this small error can be compensated for by a slip between the at least one spreading element surface 13, 22 and the at least one rolling surface 14, 24 or by bearing tolerances of the pressure part 8 with respect to the brake caliper 2.

It can particularly preferably be provided that the first rolling surface 14 spans a plane normal to the first straight line, and that the spreading element 12, the pressing part 8 and the brake caliper 2 are arranged relative to one another in such a way that the axis of rotation 20 of the spreading element 12 is in the starting position 18 and the axis of rotation 20 of the spreading element 12 are arranged in the end position on opposite sides of the plane of the rolling surface 14. This means that the axis of rotation 20 of the spreading element 12 traverses the plane spanned by the first rolling surface 14 when it rotates through the entire operating angle range of the spreading element 12.

Particularly preferably it can be provided that a ratio of a first normal distance of the axis of rotation 20 of the spreading element 12 in the starting position to the plane of the first rolling surface 14 and a second normal distance of the axis of rotation 20 of the spreading element 12 in the end position to the plane of the first rolling surface 14 is between 0.5 and 2, preferably between 0.7 and 1.5, particularly preferably substantially 1. This means that the plane of the first rolling surface 14 is arranged essentially centrally between the starting position 18 and the end position of the axis of rotation 20 of the spreading element 12. A particularly small error can be achieved through this relationship.

Particularly preferably, it can be provided that a profile of the first spreading element surface 13 forms a first rolling curve, that the first rolling curve has at least one center of curvature, and that with at least a large part of the rotation of the expanding body 12 that takes place to actuate the brake device 1, the axis of rotation 20 of the expanding body 12 is arranged in front of the center of curvature of the contact point 21 viewed from a point of contact of the first rolling curve in the direction of the first straight line. This means that viewed in the direction from the first rolling surface 14 to the first spreading element surface 13, the axis of rotation 20 in a large part of the rotation that takes place to actuate the brake device 1, in particular at least 80% of the operating angle range, preferably in the entire operating angle range, lies in front of the centers of curvature of the individual points of contact, i.e. the evolution of the rolling curve. This has the effect that essentially with every infinitesimal rotation of the spreading element 12 from the starting position in the direction of the end position, an enlargement of the projection of the connecting line between the current center of curvature and the axis of rotation 20 in the direction of the first straight line is counteracted by a corresponding rolling of the rolling curve on the rolling surface 14, 24. The second spreading element surface 22 can have a second rolling curve with the same properties.

In particular, in a large part of the rotation that takes place to actuate the brake device 1, the distance between the axis of rotation 20 and the center of curvature of the respective contact point 21 can be greater than the radius of curvature of the circle of curvature of the respective contact point.

Furthermore, it can be provided that in a large part of the rotation that takes place to actuate the brake device 1, the distance between the axis of rotation 20 and the center of curvature of the respective point of contact is less than ten times, in particular five times, particularly preferably three times, the radius of curvature of the circle of curvature of the respective point of contact.

It can preferably be provided that the first rolling curve is substantially an arc of a circle. The second rolling curve can also be substantially an arc of a circle. The circular arc shape results in kinematics between the spreading element 12 and the actuation surfaces 7, 10 that are mathematically easy to grasp and structurally easy to implement. In the case of a circular arc as the rolling curve, the center of curvature 19 corresponds to the circular arc center, wherein the position of the axis of rotation 20 when the rolling curve rolls on a flat first rolling surface 14 can be represented mathematically as a cycloid, in particular as an elongated cycloid.

Furthermore, it can be provided that when the spreading element 12 is rotated to actuate the brake device 1, a distance measured normal to the first straight line between a center point of the first spreading element surface 13 and a center point of the second spreading element surface 22 increases continuously. The center can correspond to the respective center of curvature.

It can be provided that the spreading element surfaces 13, 22 and the actuation surfaces 7, 10 are arranged in a plane normal to the axis of rotation 20 of the spreading element 12.

However, it can preferably be provided that the spreading element surfaces 13, 22 and the actuation surfaces 7, 10, viewed along the axis of rotation 20, are divided such that the axis of rotation 20 of the spreading element is free of tilting moments. As a result, a particularly compact design of the brake device 1 can be achieved.

Alternatively, it can be provided as a further preferred embodiment that the spreading element 12 forms a ball ramp 29 with the first actuation surface 7 and/or the second actuation surface 10. The axis of rotation 20 of the spreading element can in particular be parallel to the first straight line. Here, one of the spreading element surfaces 13, 22 and/or the associated actuation surface 7, 10 has a ramp, wherein a ball is movably arranged as a rolling body 28 on the ramp. By rotating the spreading element surface 13,22 with respect to the associated actuation surface 7,10, the ball rolls on the ramp and thus leads to a deflection of the respective actuation surface 7,10 in relation to the spreading element in the direction of the axis of rotation 20, and thus in the direction of the first straight line. As a result, the pressing part 8 moves linearly with respect to the brake caliper 2 along the first straight line.

Ball ramps can preferably be formed on both actuation surfaces 7, 10. This results in a bilateral deflection of the actuation surface 7, 10 in the direction of the first straight line when the spreading element 12 is rotated.

In particular, it can be provided that the spreading element 12 has a circumferential groove 40, in which groove 40 a nose 41 of the movement damping part 5 engages. As a result, the position of the movement damping part 5 with respect to the range of the spreading element is coupled in a fixed position with the groove 40 in the direction of the first straight line. The nose 41 can in particular be fastened or molded onto the fastening component 21.

The invention claimed is:
1. A brake device comprising:
a guide receiving area for connecting to a bearing component, thereby forming a bearing of the brake device which can be moved in a direction of a first straight line;
a brake caliper with a first frictional surface and a first actuation surface; and
a pressing part being linearly guided substantially along the first straight line relative to the brake caliper, the pressing part having a second frictional surface facing the first frictional surface and a second actuation surface facing away from the second frictional surface;

wherein a region between the first frictional surface and the second frictional surface is provided for the arrangement of a brake body;

wherein the brake device has a spreading element which interacts with the first actuation surface and the second actuation surface;

wherein the spreading element is formed such that the rotation of the spreading element changes a minimum distance between the frictional surfaces; and wherein a movement damping part which is coupled to the spreading element to damp a translational movement of the spreading element relative to the bearing component in the guide receiving area parallel to the first straight line.

2. The brake device according to claim 1, wherein:
the movement damping part has a contact surface for contacting the bearing component; and
the damping of a translational movement is performed between the movement damping part and the bearing component through a friction between the contact surface and the bearing component.

3. The brake device according to claim 1, wherein an axis of rotation of the spreading element is held in a substantially fixed position relative to the movement damping part at least in the direction of the first straight line.

4. The brake device according to claim 1, wherein the brake device has at least one return spring counteracting a spreading action of the spreading element.

5. The brake device according to claim 1, wherein, in order to rotate the spreading element, the spreading element is operatively connected to an electric motor via an actuation mechanism.

6. The brake device according to claim 1, wherein the actuation mechanism has a non-linear translation between a first rotation of the electric motor and a second rotation of the spreading element.

7. The brake device according to claim 1, wherein the movement damping part comprises a fastening component, that the guide receiving area is part of the fastening component, and that the brake caliper and the pressing part are guided linearly on the fastening component substantially along the first straight line.

8. The brake device according to claim 1, wherein the actuation mechanism and the electric motor are arranged on the fastening component.

9. The brake device according to claim 1, wherein the electric motor is arranged on the fastening component on a side of the guide receiving area facing away from the spreading element.

10. The brake device according to claim 1, wherein the guide receiving area is part of the brake caliper, wherein the movement damping part is movably connected to the guide receiving area in the direction of the first straight line.

11. The brake device according to claim 1, wherein the movement damping part has a pin mounted movably in the direction of the first straight line in the guide receptacle, wherein the pin is for exerting a spring force on the bearing component and is operatively connected to a spring.

12. The brake device according to claim 1, wherein when the spreading element is rotated to actuate the brake device, a first spreading element surface is in direct contact with a first rolling surface and substantially rolls on the first rolling surface, and that the first rolling surface corresponds to the first actuation surface or the second actuation surface.

13. The brake device according to claim 1, wherein the spreading element forms a ball ramp with at least one of the first actuation surface and the second actuation surface.

14. A wheel bearing comprising:
a brake disc as a brake body;
a bearing component; and
the brake device according to claim 1.

15. A vehicle comprising the brake device according to claim 1.

16. The brake device according to claim 1, wherein the spreading element is mounted on the first actuation surface and/or the second actuation surface in a roller bearing.

17. The brake device according to claim 16, wherein the spreading element is designed as a needle bearing.

* * * * *